US010347241B1

(12) United States Patent
Meng et al.

(10) Patent No.: US 10,347,241 B1
(45) Date of Patent: Jul. 9, 2019

(54) SPEAKER-INVARIANT TRAINING VIA ADVERSARIAL LEARNING

(71) Applicant: Microsoft Technology Licensing, LLC, Redmond, WA (US)

(72) Inventors: Zhong Meng, Redmond, WA (US); Vadim Aleksandrovich Mazalov, Issaquah, WA (US); Yifan Gong, Sammamish, WA (US); Yong Zhao, Redmond, WA (US); Zhuo Chen, Redmond, WA (US); Jinyu Li, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/934,566

(22) Filed: Mar. 23, 2018

(51) Int. Cl.
*G10L 25/30* (2013.01)
*G10L 15/02* (2006.01)
*G10L 15/16* (2006.01)
*G10L 15/06* (2013.01)

(52) U.S. Cl.
CPC ............ *G10L 15/16* (2013.01); *G10L 15/063* (2013.01)

(58) Field of Classification Search
CPC ...... G06N 3/0454; G06N 7/005; G10L 15/02; G10L 15/063; G10L 15/08; G10L 15/16; G10L 17/18
USPC ................................ 704/202, 232, 257, 259
See application file for complete search history.

(56) References Cited

U.S. PATENT DOCUMENTS

2015/0161994 A1* 6/2015 Tang ...................... G10L 15/02
704/232

OTHER PUBLICATIONS

Ghahabi, Omid, et al., "Deep Belief Networks for I-Vector Based Speaker Recognition", In Proceedings of IEEE International Conference on Acoustic, Speech and Signal Processing (ICASSP), Jan. 2014, pp. 1719-1723.
Hinton, Geoffrey, et al., "Deep Neural Networks for Acoustic Modeling in Speech Recognition: The Shared Views of Four Research Groups", In IEEE Signal Processing Magazine, vol. 29, Issue 6, Nov. 1, 2012, pp. 82-97.
Lei, Howard, "Joint Factor Analysis (JFA) and i-vector Tutorial", https://web.archive.org/web/20111027115214/http://www1.icsi.berkeley.edu/Speech/presentations/AFRL_ICSI_visit2_JFA_tutorial_icsitalk.pdf, Jan. 2011, 26 Pages.

(Continued)

*Primary Examiner* — George C Monikang
(74) *Attorney, Agent, or Firm* — Schwegman Lundberg & Woessner, P.A.

(57) ABSTRACT

Systems and methods can be implemented to conduct speaker-invariant training for speech recognition in a variety of applications. An adversarial multi-task learning scheme for speaker-invariant training can be implemented, aiming at actively curtailing the inter-talker feature variability, while maximizing its senone discriminability to enhance the performance of a deep neural network (DNN) based automatic speech recognition system. In speaker-invariant training, a DNN acoustic model and a speaker classifier network can be jointly optimized to minimize the senone (triphone state) classification loss, and simultaneously mini-maximize the speaker classification loss. A speaker invariant and senone-discriminative intermediate feature is learned through this adversarial multi-task learning, which can be applied to an automatic speech recognition system. Additional systems and methods are disclosed.

20 Claims, 6 Drawing Sheets

(56) References Cited

OTHER PUBLICATIONS

Meng, Zhong, et al., "Unsupervised Adaptation with Domain Separation Networks for Robust Speech Recognition", In Proceedings of IEEE Automatic Speech Recognition and Understanding Workshop, Nov. 21, 2017, pp. 214-221.

Renals, Steve, "Deep Neural Network Acoustic Methods", https://www.inf.ed.ac.uk/teaching/courses/asr/2015-16/asr08-dnn.pdf, Feb. 25, 2016, 29 Pages.

Richardson, Fred, et al., "A Unified Deep Neural Network for Speaker and Language Recognition", https://groups.csail.mit.edu/sls/publications/2015/Dehak1_Interspeech-2015.pdf, Sep. 2015, 5 Pages.

Shinohara, Yusuke, "Adversarial Multi-task Learning of Deep Neural Networks for Robust Speech Recognition", In Proceedings of International Speech Communication Association, Sep. 8, 2016, 2369-2372.

* cited by examiner

SPEAKER-INVARIANT TRAINING VIA ADVERSARIAL LEARNING

TECHNICAL FIELD

Embodiments described herein generally relate to methods and apparatus related to speech recognition.

BACKGROUND

A deep neural network (DNN) is a stacked feed-forward, artificial neural network that has more than one layer of hidden units between its inputs and its outputs. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. A set of items, as used herein, is a group of one or more items. For example, a set of coefficients is a group of one or more coefficients. These input-weight products are summed and the sum is passed through what is called a node's activation function, to determine whether and to what extent that signal progresses further through the network to affect the ultimate outcome. DNN uses a cascade of many layers of nonlinear processing units for feature extraction and transformation. Each successive layer uses the output from the previous layer as input. Higher level features can be derived from lower level features to form a hierarchical representation. The layers following the input layer may be convolution layers that are feature maps that can include filtering of the inputs to each convolution layer.

Speech can be viewed as a continuous audio stream in which substantially stable states mix with dynamically changed states. In this sequence of states, one can define classes of sounds, or phones, which are speech segments. A phone is a speech segment that possesses distinct physical or perceptual properties, considered as a physical event without regard to its place in the phonology of a language. When a phone is considered in context with a first part of the phone depending on its preceding phone, the middle part of the phone being stable, and the next part of the phone depending on the subsequent phone, such a phone in context is called a triphone. Each triphone is represented by a hidden Markov model (HMM) with several states. Many states of the HMMs are shared (tied together) among different triphones. A tied state in the triphone HMM is called a senone. Speech recognition scientists have identified several thousand senones into which all speech may be divided. An acoustic model contains acoustic properties for each senone.

A DNN based acoustic model has been widely used in automatic speech recognition (ASR) and has achieved extraordinary performance. However, a speaker-independent (SI) acoustic model trained with speech data collected from a large number of speakers suffers from a large degradation in ASR performance when tested with speakers not included in the training set. This degradation results from the spectral variations in each speech unit caused by the inter-speaker variability in addition to the phonetic variations characterized by the SI acoustic model.

A simple solution to the inherent inter-speaker variability in speech signals is to perform feature space normalization over different speakers before estimating the acoustic model parameters, such as cepstrum mean and variance normalization, vocal tract length normalization, and metamorphic algorithm. Cepstrum analysis is a nonlinear signal processing technique with a variety of applications in areas such as speech and image processing in which the complex cepstrum of a sequence x is calculated by finding the complex natural logarithm of the Fourier transform of x, then the inverse Fourier transform of the resulting sequence. A more sophisticated solution that generates acoustic models with reduced variance is to perform speaker-adaptive training (SAT).

For a DNN acoustic model, factorized hidden layer, cluster adaptive training, and speaker code approaches have been proposed, in which the weights or/and the biases of the speaker-dependent (SD) affine transformation in each hidden layer of a DNN acoustic model are represented as a linear combination of SI bases, where the combination weights are low-dimensional speaker representations initialized with an i-vector. An i-vector framework is a factor analysis method for a compact representation of speaker characteristics. The framework maps every speaker utterance to a low dimensional identity vector. Target and test i-vectors can then be compared using a cosine distance metric. In various implementations, i-vectors convey speaker characteristics among other information such as transmission channel, acoustic environment or phonetic content of a speech segment. The canonical SI bases with reduced variances are learned during adaptive training. The speaker representations for the test speaker are estimated using adaptation data and are used for testing. In SAT-learning hidden units contribution, a canonical speaker-adaptive DNN along with SD amplitude parameters for all the hidden units are learned during adaptive training.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, mechanical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Inherent speaker variability in training and test speech signal degrades the performance of automatic speech recognition. In various embodiments, speaker-invariant training (SIT) is implemented to reduce the effect of speaker variability on acoustic modeling in a manner to suppress speaker variance in each speech unit of a DNN based SI acoustic model. In SIT, a DNN acoustic model and a DNN speaker classifier can be jointly optimized to minimize senone (tied triphone state) classification loss and simultaneously mini-maximize speaker classification loss through adversarial multi-task learning. A speaker-invariant and senone-discriminative intermediate feature is learned through this adversarial multi-task learning. With SIT, a canonical DNN acoustic model with significantly reduced variance in its output distribution is learned with no explicit transformation attached to each speaker or utterance during training or testing.

Figure 1:
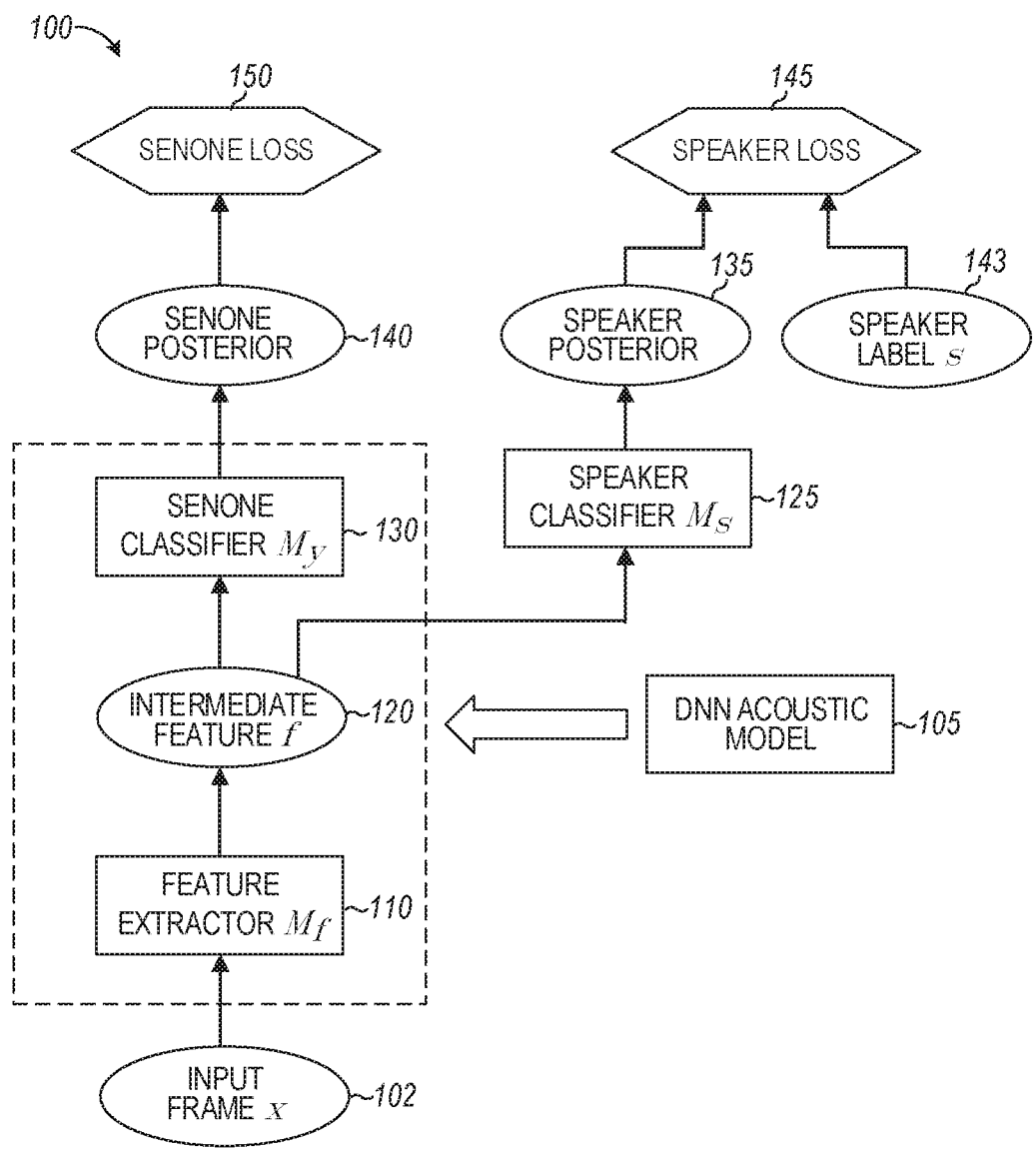
FIG. 1 is an example framework of adversarial learning for unsupervised adaptation of acoustic models, in accordance with various embodiments.

FIG. 1 is an embodiment of an example framework 100 of adversarial learning for unsupervised adaptation of acoustic models. Framework 100 provides an architecture for speaker-invariant training including sub-networks. All of these sub-networks may be jointly optimized. The joint optimization may be accomplished using stochastic gradient descent (SGD). SGD is a stochastic approximation of a gradient descent optimization and iterative method for minimizing an objective function that is written as a sum of differentiable functions. It is different from batch gradient descent in that SGD updates the model parameters using the gradient of one training sample at each epoch instead of summing up the gradients of all the training samples. Variations of the approach of framework 100 may include not all of the sub-networks being jointly optimized.

Framework 100 includes a DNN acoustic model 105. The lower layers of DNN acoustic model 105 can be viewed as a feature extractor network $M_f$ 110 that maps input speech frames from input frame x 102 into intermediate features. An intermediate feature from feature extractor network $M_f$ 110 is an intermediate feature f 120 of DNN acoustic model 105. The upper layers of DNN acoustic model 105 can be viewed as a senone classifier network $M_y$ 130 that maps the intermediate features of DNN acoustic model 105 to senone posterior 140, where senone posterior 140 is used to generate a senone loss 150. Intermediate feature f 120 is provided as an input to speaker classifier network $M_s$ 125, which has an output providing a speaker posterior 135. Speaker posterior 135 along with speaker label s 143 are used to generate a speaker loss 145. A posterior, as used herein, is a posterior probability of a random event or an uncertain proposition, which is a conditional probability that is assigned after relevant data or background is taken into account. The relevant data or background may be acquired from experiment or survey.

Adversarial training of speaker classifier network $M_s$ 125, which maps the intermediate feature f 120 to its speaker label s 143, and feature extractor network $M_f$ 110 in DNN acoustic model 105 is performed. This adversarial training includes minimizing speaker classification error with respect to speaker classifier network $M_s$ 125, while simultaneously maximizing the speaker classification error with respect to feature extractor network $M_f$ 110.

Senone classification loss of the DNN acoustic model 105 is minimized with respect to senone classifier network $M_y$ 130 and feature extractor network $M_f$ 110 to ensure the senone-discriminativeness of the intermediate feature. The optimized feature extractor network AM 110 and senone classifier network $M_y$ 130 can form an adapted acoustic model for subsequent robust speech recognition.

The general framework of SIT, for example framework 100, suppresses the effect of variations on acoustic modeling induced by the inherent speaker-variability in the speech signal. The deep neural network acoustic model and the speaker classifier network are trained to jointly optimize the primary task of senone classification and the secondary task of speaker classification with an adversarial objective function. SIT can be applied to far-field speech recognition with multiple speakers in the training and test set. When a microphone is close to the mouth of an individual talking, the quality of the audio tends to be better and louder than the surrounding noise. This area in the neighborhood of the microphone is known as the near-field. The challenge arises when the user moves further away from the microphone into the 'far-field', which may be a distance greater than one meter. SIT can also be applied to noisy speech recognition with multiple speakers in the training and test set. SIT can be implemented in an application to kids' speech recognition with multiple speakers in the training and test set.

SIT directly minimizes the speaker variations by optimizing an adversarial multi-task objective other than the most basic cross entropy object as in SAT. It forgoes the need of estimating any additional SI bases or speaker representations during training or testing. The direct use of a SIT DNN acoustic model in testing enables the generation of word transcription for unseen test speakers through one-pass online decoding. Moreover, it effectively suppresses the inter-speaker variability via a lightweight system with much reduced training parameters and computational complexity. To achieve additional gain, unsupervised speaker adaptation can also be further conducted on the SIT model with one extra pass of decoding.

To perform SIT, a sequence of speech frames $X=\{x_1, \ldots, x_N\}$, a sequence of senone labels $Y=\{y_1, \ldots, y_N\}$ aligned with X, and a sequence of speaker labels $S=\{s_1, \ldots, s_N\}$ aligned with X can be used. The goal of SIT is to reduce the variances of hidden and output unit distributions of the DNN acoustic model 105, in the example of FIG. 1, that are caused by the inherent inter-speaker variability in the speech signal. To achieve speaker-robustness, a speaker-invariant and senone-discriminative intermediate feature in the DNN acoustic model 105 is learned through adversarial multi-task learning and senone posterior predictions are made based on the learned intermediate feature. In this approach, the first few layers of the acoustic model are viewed as a feature extractor network $M_f$ 110 with parameters $\theta_f$ that maps input speech frames X from different speakers to intermediate features $F=\{f_1, \ldots, f_N\}$ (see FIG. 1) and maps the upper layers of the acoustic model as a senone classifier network $M_y$ 130 with parameters $\theta_y$ that maps the intermediate features F to the senone posteriors 140 given by $p(q|f; \theta_y)$, $q \in Q$, q being a senone in a set Q of senones, as follows:

$$M_y(f_i)=M_y(M_f(x_i))=p_y(q|x_i;\theta_f,\theta_y) \quad (1)$$

A speaker classifier network $M_s$ maps the intermediate features F to the speaker posteriors $p_s(a|x_i; \theta_s; \theta_f)$, $a \in A$ as follows:

$$M_s(M_f(x_i)) = p_s(a|x_i; \theta_s, \theta_f) \quad (2)$$

where a is one speaker in the set of all speakers A.

To make the intermediate features F speaker-invariant, the distributions of the features from different speakers should be as close to each other as possible. Therefore, the networks $M_f$ and $M_s$ are jointly trained with an adversarial objective, in which $\theta_f$ is adjusted to maximize the speaker classification loss $\mathcal{L}_{speaker}^f(\theta_f)$, while $\theta_s$ is adjusted to minimize the frame-level speaker classification loss $\mathcal{L}_{speaker}^s(\theta_s)$ below:

$$\mathcal{L}_{speaker}(\theta_f, \theta_s) = -\sum_i^N \log p_s(s_i | x_i; \theta_f) \quad (3)$$

$$= -\sum_i^N \sum_{a \in A} 1_{[a=s_i]} \log M_s(M_f(x_i))$$

where $s_i$ denotes the speaker label for the input frame $x_i$ of the acoustic model.

This mini-max competition will first increase the discriminativity (ability to discriminate) of network $M_s$ and the speaker-invariance of the features generated by network $M_f$, and will eventually converge to the point where network $M_f$ generates extremely confusing features that network $M_s$ is unable to distinguish.

At the same time, it is desired to make the intermediate features senone-discriminative by minimizing the cross-entropy loss between the predicted senone posteriors 140 and the senone labels as follows:

$$\mathcal{L}_{senone}(\theta_f, \theta_y) = -\Sigma_i p_y(y_i|x_i; \theta_f, \theta_y) M_y(M_f(x_i)) \quad (4)$$

In SIT, the acoustic model network and the speaker classifier network are trained to jointly optimize the primary task of senone classification and the secondary task of speaker classification with an adversarial objective function. Therefore, the total loss can be constructed as $$\mathcal{L}_{total}(\theta_f, \theta_y, \theta_s) = \mathcal{L}_{senone}(\theta_f, \theta_y) - \lambda \mathcal{L}_{speaker}(\theta_s, \theta_f) \quad (5)$$

where $\lambda$ controls the trade-off between the senone loss and the speaker classification loss in equation (4) and equation (3) respectively.

The optimal parameters $\hat{\theta}_y$, $\hat{\theta}_f$, and $\hat{\theta}_s$ are to be found such that $$(\hat{\theta}_f, \hat{\theta}_y) = \min_{\theta_y, \theta_f} \mathcal{L}_{total}(\theta_f, \theta_y, \theta_s) \quad (6)$$

$$\hat{\theta}_s = \max_{\theta_s} \mathcal{L}_{total}(\hat{\theta}_f, \hat{\theta}_y, \theta_s) \quad (7)$$

The parameters are updated as follows via back propagation through time with SGD:

$$\theta_f \leftarrow \theta_f - \mu \left[ \frac{\partial \mathcal{L}_{senone}}{\partial \theta_f} - \lambda \frac{\partial \mathcal{L}_{speaker}}{\partial \theta_f} \right] \quad (8)$$

$$\theta_s \leftarrow \theta_s - \mu \frac{\partial \mathcal{L}_{speaker}}{\partial \theta_s} \quad (9)$$

$$\theta_y \leftarrow \theta_y - \mu \frac{\partial \mathcal{L}_{senone}}{\partial \theta_y} \quad (10)$$

where $\mu$ is the learning rate.

Note that the negative coefficient $-\lambda$ in equation (8) induces a reversed gradient that maximizes $\mathcal{L}_{speaker}(\theta_f, \theta_s)$ in equation (3) and makes the intermediate feature speaker-invariant. For easy implementation, gradient reversal layer can be introduced, which acts as an identity transform in the forward propagation and multiplies the gradient by $-\lambda$ during the backward propagation.

The optimized network consisting of networks M/and M can be used as the SIT acoustic model for ASR on test data. When training on the test data reaches an acceptable level, networks $M_f$ and $M_s$ can be used as the SIT acoustic model for ASR in an active system. The trained acoustic model can be used as a component of an ASR unit in a number of different types of devices and systems. For example, ASR using the trained acoustic model can be implemented in digital assistants, chatbots, voice control applications, and other related devices and systems including in associated voice services such as software development kit (SDK) offerings. ASR services using the trained acoustic model can be implemented in cloud architectures. A chatbot is a program that can conduct conversations via auditory or textual methods. A bot is a program that can access web sites and gather content based on a provided search index. The web sites can be coupled to the Internet, an intranet, or the web sites may be databases, each database accessible by its own addresses according to a protocol for the respective database.

Typically, the term "cloud" with respect to data processing and communicating refers to a data center full of servers that is connected to the Internet. However, cloud may refer to any network or combinations of networks. A cloud can include a wide area network (WAN) like the public Internet or a private, national or global network, and may include a local area network (LAN) within an organization providing the services of the data center. In addition, the term "cloud computing" refers to the software and services executed for users by these servers, and typically the user is unaware of the physical location of the servers or data center. Further, the data center may be a distributed entity. Cloud computing can provide shared computer processing resources and data to computers and other devices on demand over the associated networks.

In experiments, SIT was performed on a DNN-hidden Markov model (HMM) acoustic model for ASR on a CHiME-3 (3rd CHiME Speech Separation and Recognition Challenge) dataset. The CHiME-3 dataset incorporated Wall Street Journal (WSJ0) corpus sentences spoken in challenging noisy environments, recorded using a 6-channel tablet based microphone array. CHiME-3 dataset consisted of both real and simulated data. The real speech data was recorded in five real noisy environments (on buses (BUS), in cafes (CAF), in pedestrian areas (PED), at street junctions (STR) and in booth (BTH)). To generate the simulated data, the clean speech was first convolved with the estimated impulse response of the environment and then mixed with the background noise separately recorded in that environment. The noisy training data consisted of 1999 real noisy utterances from 4 speakers, and 7138 simulated noisy utterances from 83 speakers in the English SI84 (WSJ0) average voice model training set recorded in 4 noisy environments. There were 3280 utterances in the development set including 410 real and 410 simulated utterances for each of the 4 environments. There were 2640 utterances in the test set including 330 real and 330 simulated utterances for each of the 4 environments. The speakers in training set, development set and the test set were mutually different (i.e., 12 different speakers in the CHiME-3 dataset). The training, development and test data sets were all recorded in 6 different channels.

In the experiments, 9137 noisy training utterances in the CHiME-3 dataset were used as the training data. The real and simulated development data in CHiME-3 were used as the test data. Both the training and test data were far-field speech from the 5th microphone channel. The WSJ0 5K word 3-gram language model (LM) was used for decoding.

In a baseline system, an SI DNN-HMM acoustic model was first trained using 9137 noisy training utterances with cross-entropy criterion. The 29-dimensional log Mel filterbank features together with 1st and 2nd order delta features (87-dimensional in total) for both the clean and noisy utterances were extracted by following the process. Each frame was spliced together with 5 left and 5 right context frames to form a 957-dimensional feature. The spliced features were fed as the input of the feed-forward DNN after global mean and variance normalization. The DNN had 7 hidden layers with 2048 hidden units for each layer. The output layer of the DNN had 3012 output units corresponding to 3012 senone labels. Senone-level forced alignment of the clean data was generated using a Gaussian mixture model-HMM system. The word error rates (WERs) for the SI DNN were 17.84% and 17.72% on real and simulated test data, respectively. Note that the experimental setup did not achieve state-of-the-art performance on the CHiME-3 dataset (for example, beamforming, sequence training, or use recurrent neural network language model for decoding was not performed), since the goal was to simply verify the effectiveness of SIT in reducing inter-speaker variability.

SIT for robust speech recognition was performed on the baseline noisy DNN acoustic model with 9137 noisy training utterances in CHiME-3. The feature extractor network $M_f$ was initialized with the first $N_h$ layers of the DNN acoustic model and the senone classifier was initialized with the rest (7–$N_h$) of the hidden layers plus the output layer. $N_h$ indicates the position of the intermediate feature in the DNN acoustic model. The speaker classifier network $M_s$ was a feedforward DNN with 2 hidden layers and 512 hidden units for each layer. The output layer of speaker classifier network $M_s$ had 87 units predicting the posteriors of 87 speakers in the training set. Networks $M_f$, $M_y$ and $M_s$ were jointly trained with an adversarial multi-task objective as described above. $N_h$, and $\lambda$ were fixed at 2 and 3.0 in the experiments. The SIT DNN acoustic model achieved 16.95% and 16.54% WER on the real and simulated test data, respectively, which were 4.99% and 6.66% relative improvements over the SI DNN baseline.

Figure 2:
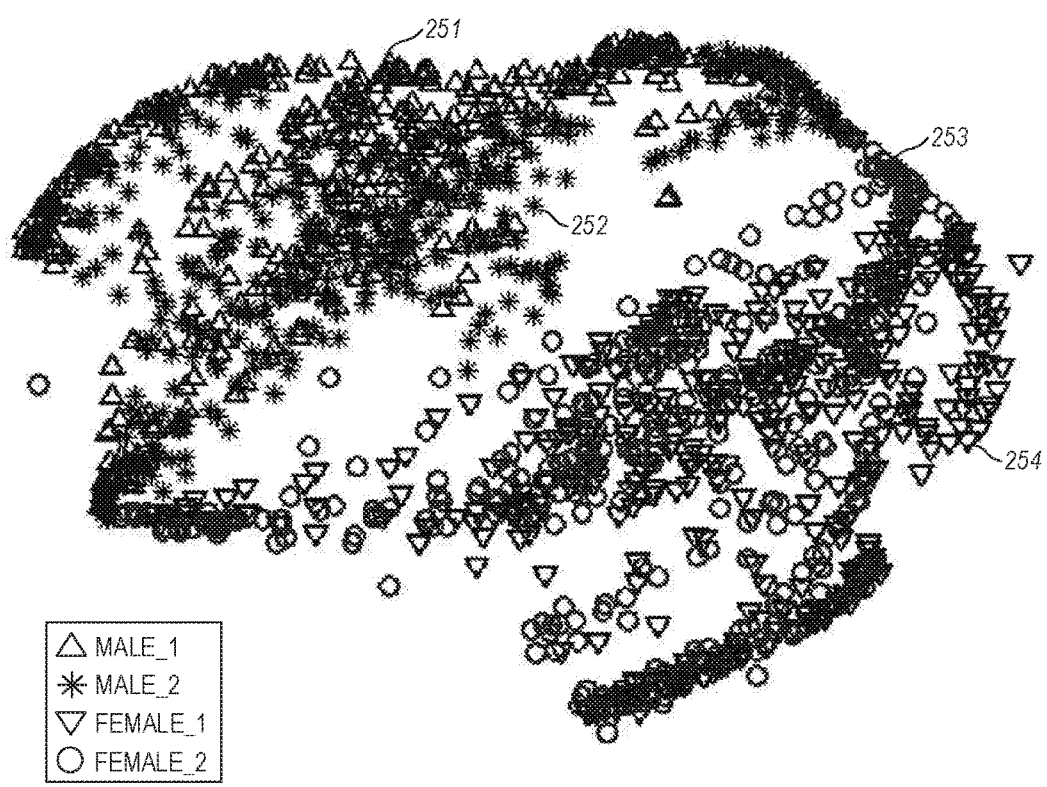
FIG. 2 is a t-distributed stochastic neighbor embedding visualization of the intermediate features F generated by a speaker-independent deep neural network acoustic model when speech frames aligned with phoneme "ah" from two male and two female speakers were fed as the input, in accordance with various embodiments.
Figure 3:
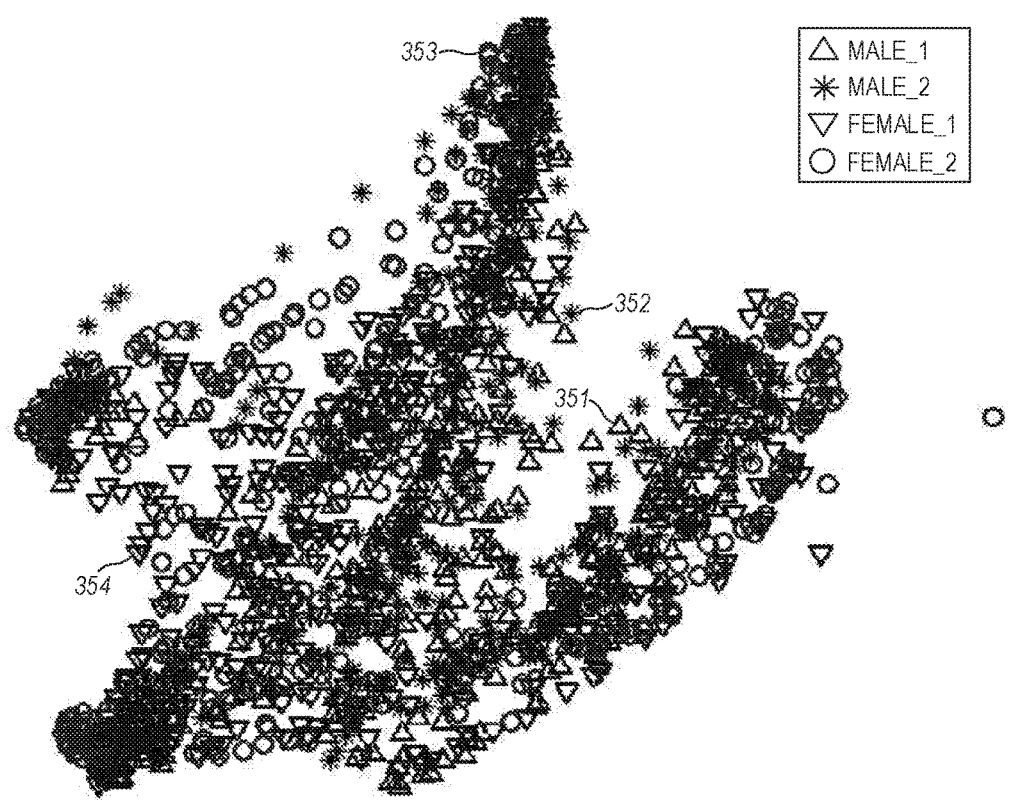
FIG. 3 is a t-distributed stochastic neighbor embedding visualization of the intermediate features F generated by a speaker-invariant training deep neural network acoustic model when the same speech frames as in FIG. 2 were fed as the input, in accordance with various embodiments.

In experiments to visualize intermediate features, two male speakers and two female speakers were randomly selected from the noisy training set and speech frames aligned with the phoneme "ah" were extracted for each of the four speakers. FIG. 2 is a t-distributed stochastic neighbor embedding (t-SNE) visualization of the intermediate features F generated by the SI DNN acoustic model when speech frames aligned with phoneme "ah" from two male and two female speakers in CHiME-3 training set were fed as the input. FIG. 3 is a t-SNE visualization of the intermediate features F generated by the SIT DNN acoustic model when the same speech frames as in FIG. 2 were fed as the input. The t-SNE procedure is a technique for dimensionality reduction that is particularly well suited for the visualization of high-dimensional datasets.

In FIG. 2, the intermediate feature distributions 251 and 252 in the SI model for the males and the intermediate feature distributions 253 and 254 in the SI model for the female speakers are far away from each other and even the distributions for the speakers of the same gender are separated from each other. While after SIT, the intermediate feature distributions 351 and 352 for the males and the intermediate feature distributions 353 and 354 for the female speakers were well aligned with each other as shown in FIG. 3. The significant increase in the overlap among distributions of different speakers justifies that the SIT remarkably enhances the speaker-invariance of the intermediate features F. The adversarial optimization of the speaker classification loss does not just serve as a regularization term to achieve better generalization on the test data.

Experiments were made directed to unsupervised speaker adaptation. SIT aims at suppressing the effect of inter-speaker variability on DNN acoustic model so that the acoustic model is more compact and has stronger discriminative power. When adapted to the same test speakers, the SIT DNN is expected to achieve higher ASR performance than the baseline SI DNN due to the smaller overlaps among the distributions of different speech units.

In an experiment, the SI and SIT DNN acoustic models were adapted to each of the 4 speakers in the test set in an unsupervised fashion. A constrained re-training (CRT) method was used for adaptation, where the DNN parameters of only a subset of layers were re-estimated, while holding the remaining parameters fixed during cross-entropy training. The adaptation target (1-best alignment) was obtained through a first-pass decoding of the test data, and the second-pass decoding was performed using the speaker adaptive (SA) SI and SA SIT DNN acoustic models.

The WER results for unsupervised speaker adaptation were for the case in which only the bottom two layers of the SI and SIT DNN acoustic models were adapted during CRT. The SA SIT DNN achieved 15.46% WER, which is 4.86% relatively higher improvement than the WER for the SA SI DNN of 16.25%. The CRT adaptation provided 8.91% and 8.79% relative WER gains over the unadapted SI and SIT models, respectively. The lower WER after speaker adaptation indicates that SIT has effectively reduced the high variance and overlap in an SI acoustic model caused by the inter-speaker variability.

In various embodiments, SIT can be implemented to suppress the effect of inter-speaker variability on the SI DNN acoustic model. In SIT, a DNN acoustic model and a speaker classifier network are jointly optimized to minimize the senone classification loss, and simultaneously mini-maximize the speaker classification loss. Through this adversarial multi-task learning procedure, a feature extractor network is learned to map the input frames from different speakers to intermediate features that are both speaker-invariant and senone-discriminative.

SIT forgoes the need for estimating any additional SI bases or speaker representations which are necessary in other conventional approaches such as SAT. The SIT trained DNN acoustic model can be directly used to generate the transcription for unseen test speakers through one-pass online decoding. It enables a lightweight speaker-invariant ASR system with reduced number of parameters for both training and testing. Additional gains are achievable by performing further unsupervised speaker adaptation on top of the SIT model.

Figure 4:
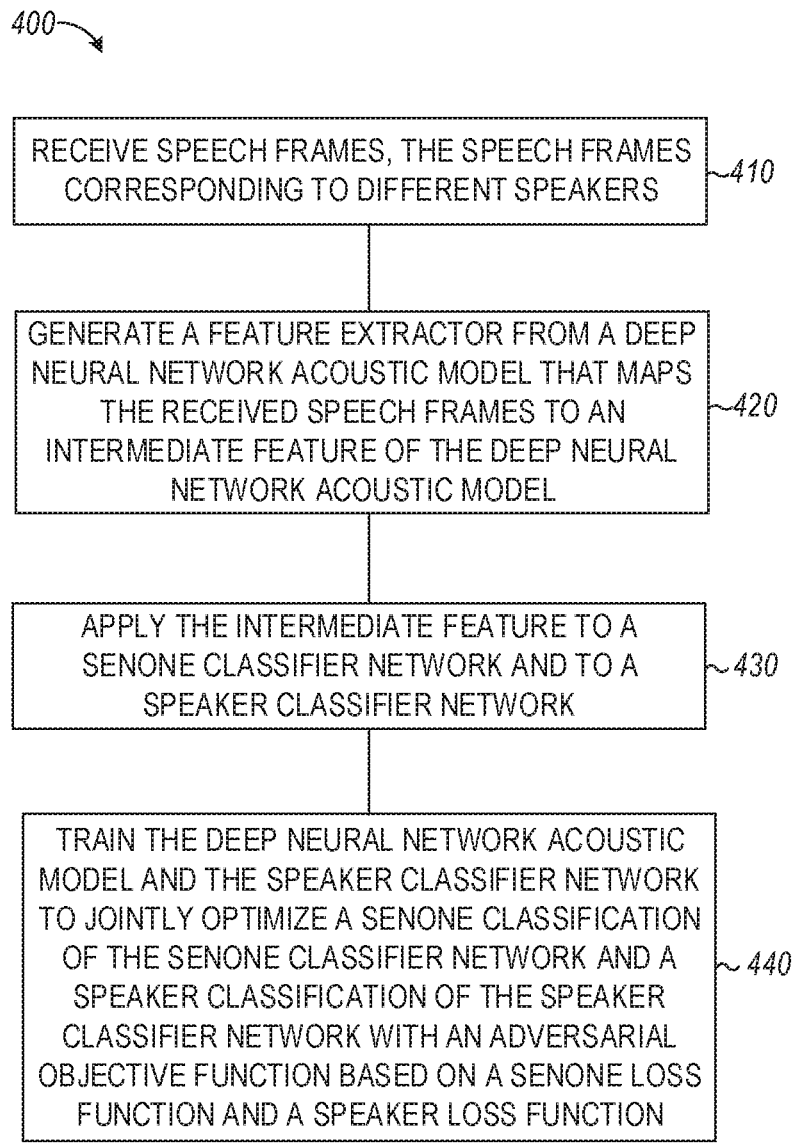
FIG. 4 is a flow diagram of features of an example method of speaker-invariant training for automatic speech recognition, in accordance with various embodiments.

FIG. 4 is a flow diagram of features of an embodiment of an example method 400 of speaker-invariant training for automatic speech recognition. Method 400 or methods similar to method 400 can be implemented by a set of one or more processors executing instructions stored in a storage device. At 410, speech frames are received, where the speech frames correspond to different speakers. At 420, a feature extractor is generated from a deep neural network acoustic model that maps the received speech frames to an intermediate feature of the deep neural network acoustic model. At 430, applying the intermediate feature is applied to a senone classifier network and to a speaker classifier network.

At 440, the deep neural network acoustic model and the speaker classifier network are trained to jointly optimize a senone classification of the senone classifier network and a speaker classification of the speaker classifier network with an adversarial objective function based on a senone loss function and a speaker loss function. Training the speaker classifier network can include minimizing a speaker classification error with respect to the speaker classifier network and simultaneously maximizing the speaker classification error with respect to the feature extractor. Jointly optimizing senone classification of the senone classifier network and speaker classification of the speaker classifier network can include using stochastic gradient descent. In various embodiments, the adversarial objective function can be a weighted difference between the senone loss function and the speaker loss function.

Method 400 or method similar to method 400 can include minimizing a senone classification error with respect to the senone classifier network and the feature extractor. Such methods can include simultaneously minimizing and maximizing the adversarial objective function with respect to the senone classifier network, the speaker classifier network, and the feature extractor to make the intermediate feature speaker-invariant. Such methods can include using the optimized classification of the senone classifier network as a component in automatic speech recognition. Variations of method 400 or methods similar to method 400 can include a number of different embodiments that may be combined depending on the application of such methods and/or the architecture of systems in which such methods are implemented.

Elements associated with the architectures, as taught herein, may communicate over a network. The network may include LANs, WANs, wireless networks (e.g., a IEEE 802.11 wireless local area network or a cellular wireless wide area network), the Public Switched Telephone Network (PSTN) network, ad hoc and device-to-device (D2D) networks, personal area networks (e.g., Bluetooth) or other combinations or permutations of network protocols and network types. The networks may include a single LAN, a WAN, or a combination of LANs and/or WANs, such as the Internet. The various devices coupled to network may be coupled to the network via one or more wired or wireless connections.

Figure 5:
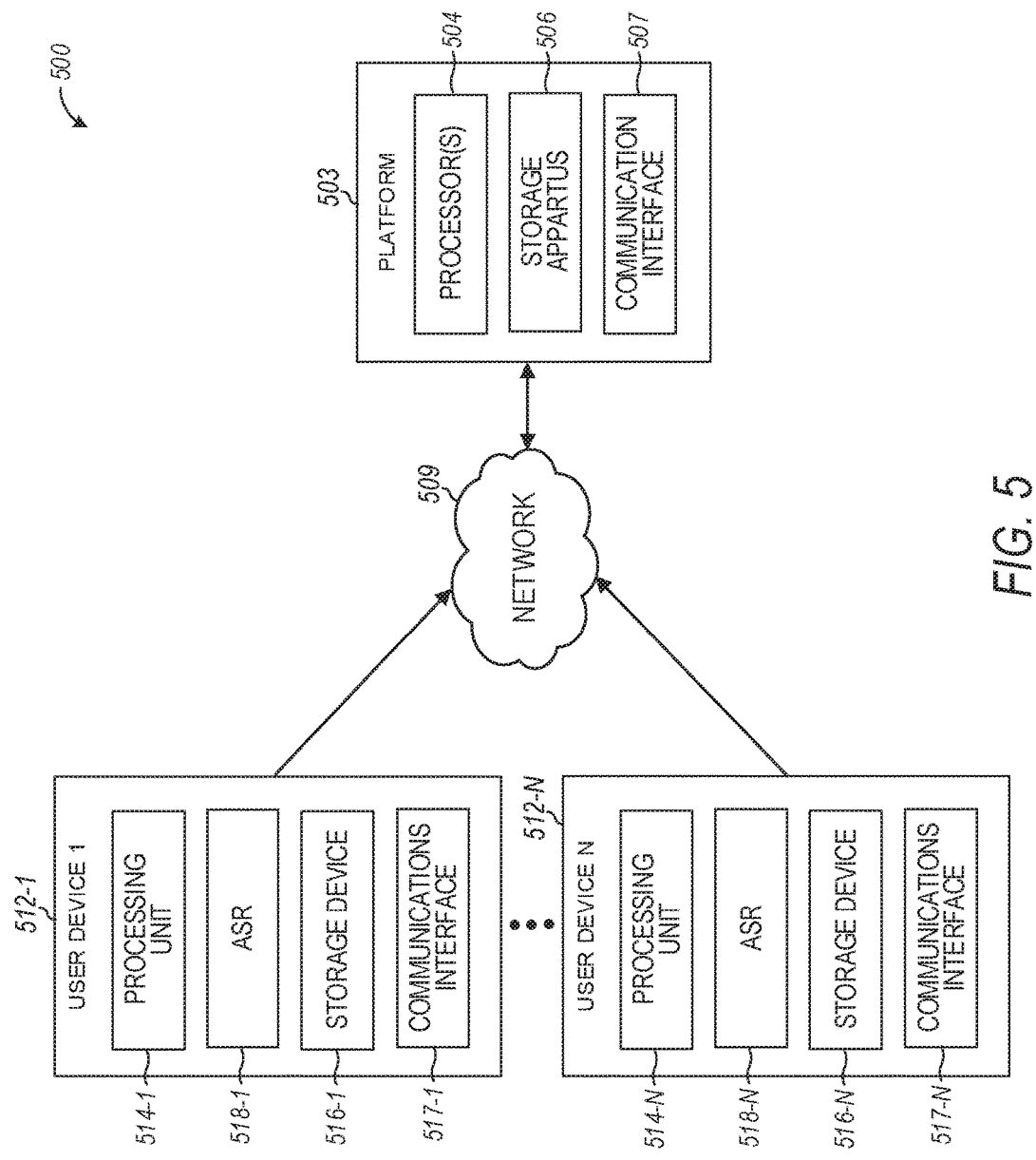
FIG. 5 is a representation of an example architecture that includes a number of devices having automatic speech recognition capability that are capable of communicating over a network, in accordance with various embodiments.

FIG. 5 is a representation of an embodiment of an example architecture 500 that includes a number of devices having automatic speech recognition capability that are capable of communicating over a network 509. Architecture 500 allows for speaker-invariant training for ASR in a number of different ways. In one approach, speaker-invariant training for ASR, as taught herein or in similar speaker-invariant training, can be conducted on a platform 503. Platform 503 can include a set of one or more processors 504 and a storage apparatus 506, where storage apparatus 506 includes instructions executable by the processor(s) 504 to conduct speaker-invariant training for ASR as taught herein or as a similar speaker-invariant training of an acoustic model for ASR implementation. The trained acoustic model can be stored in storage apparatus 506. Such a speaker-invariant training for ASR can be conducted as a service. Platform 503 may be arranged in a cloud architecture or as a stand-alone unit in a distributed network such as a distributed private network.

The trained acoustic model in platform 503 can be distributed via communication interface 507 over a network 509 to user devices 512-1 . . . 512-N for use as a component of ASR units 518-1 . . . 518-N, respectively, in user devices 512-1 . . . 512-N. User devices 512-1 . . . 512-N can include communications interfaces 517-1 . . . 517-N, respectively, to communicate over network 509 with platform 503 or other entities. The trained acoustic model received by each user device 512-1 . . . 512-N can be stored in storage devices 516-1 . . . 516-N, respectively. Each ASR unit 518-1 . . . 518-N can apply the stored trained acoustic model to a speech signal provided to or detected by respective user devices 512-1 . . . 512-N to perform automatic speech recognition.

In another approach, each of user devices 512-1 . . . 512-N can include a processing unit 514-1 . . . 514-N, respectively, and a storage device 516-1 . . . 516-N, respectively, to individually conduct speaker-invariant training for ASR, as taught herein or in a similar speaker-invariant training, using instructions stored on respective storage devices 516-1 . . . 516-N and executed by respective processing units 514-1 . . . 514-N. The trained acoustic model for each of ASR units 518-1 . . . 518-N can be stored in storage devices 516-1 . . . 516-N, respectively. Storage devices 516-1 . . . 516-N can be a different type of storage instrument than storage apparatus 506. In addition, one or more of storage devices 516-1 . . . 516-N can be a different type of storage instrument than the other storage devices 516-1 . . . 516-N. Each of processing units 514-1 . . . 514-N can include a set of one or more processors. The number of processors in a respective processing unit 514-1 . . . 514-N can depend on one or more applications to which each user device 512-1 . . . user device 512-N can individually perform. User devices 512-1 . . . 512-N may be a set of devices in which at least one device is different from the other devices of the set or has different applications that can include ASR. In addition, in this approach, platform 503 may provide other services or provide training data for one or more of the user devices 512-1 . . . 512-N to conduct speaker-invariant training for ASR units 518-1 . . . 518-N, respectively.

Embodiments described herein may be implemented in one or a combination of hardware, firmware, and software. Embodiments may also be implemented as instructions stored on one or more machine-readable storage devices, which may be read and executed by at least one processor to perform the operations described herein. A machine-readable storage device may include any non-transitory mechanism for storing information in a form readable by a machine, for example, a computer. For example, a machine-readable storage device may include read-only memory (ROM), random-access memory (RAM), magnetic disk storage media, optical storage media, flash-memory devices, and other storage devices and media.

In various embodiments, a machine-readable storage device comprises instructions stored thereon, which, when executed by a set of processors of a system, cause the system to perform operations, the operations comprising one or more features similar to or identical to features of methods and techniques described with respect to method 400, variations thereof, and/or features of other methods taught herein. The physical structures of such instructions may be operated on by the set of processors, which set can include one or more processors. Executing these physical structures can cause one or more machines of the system to perform operations comprising operations to: receive speech frames, the speech frames corresponding to different speakers; generate a feature extractor from a deep neural network acoustic model that maps the received speech frames to an intermediate feature of the deep neural network acoustic model; apply the intermediate features to a senone classifier network and to a speaker classifier network; and train the deep neural network acoustic model and the speaker classifier network to jointly optimize a senone classification of the senone classifier network and a speaker classification of the speaker classifier network with an adversarial objective function based on a senone loss function and a speaker loss function.

Operations to train the speaker classifier network can include minimizing a speaker classification error with respect to the speaker classifier network and simultaneously maximizing the speaker classification error with respect to the feature extractor. The instructions to perform operations can include instructions to perform operations minimizing a senone classification error with respect to the senone classifier network and the feature extractor. Jointly optimizing senone classification of the senone classifier network and speaker classification of the speaker classifier network includes using stochastic gradient descent. The adversarial objective function can be a weighted difference between the senone loss function and the speaker loss function.

Variations of the abovementioned machine-readable storage device or similar machine-readable storage devices can include a number of different embodiments that may be combined depending on the application of such machine-readable storage devices and/or the architecture of systems in which such machine-readable storage devices are implemented. The instructions to perform operations can include instructions to perform operations using the optimized classification of the senone classifier network as a component in automatic speech recognition.

In various embodiments, a system, having components to implement speaker-invariant training for speech recognition, comprises a set of processors and a storage device comprising instructions, which when executed by the set of processors, cause the system to perform operations. The operations can include operations to: generate a feature extractor from a deep neural network acoustic model that maps input speech frames from different speakers to an intermediate feature of the deep neural network acoustic model; apply the intermediate feature to a senone classifier network and to a speaker classifier network; and train the deep neural network acoustic model and the speaker classifier network to jointly optimize a senone classification of the senone classifier network and a speaker classification of the speaker classifier network with an adversarial objective function based on a senone loss function and a speaker loss function.

Variations of a system related to conducting speaker-invariant training, as taught herein, can include a number of different embodiments that may be combined depending on the application of such systems and/or the architecture in which systems are implemented. The operations to train the speaker classifier network can include minimization of a speaker classification error with respect to the speaker classifier network and simultaneous maximization of the speaker classification error with respect to the feature extractor. The instructions to perform operations can include minimization of a senone classification error with respect to the senone classifier network and the feature extractor. Operations to jointly optimize senone classification of the senone classifier network and speaker classification of the speaker classifier network can include using stochastic gradient descent. The adversarial objective function can be a weighted difference between the senone loss function and the speaker loss function. Simultaneous minimization and maximization of the adversarial objective function with respect to the senone classifier network, the speaker classifier network, and the feature extractor can make the intermediate feature speaker-invariant. In various embodiments, a system, as taught herein, can use the optimized classification of the senone classifier network as a component in automatic speech recognition.

Figure 6:
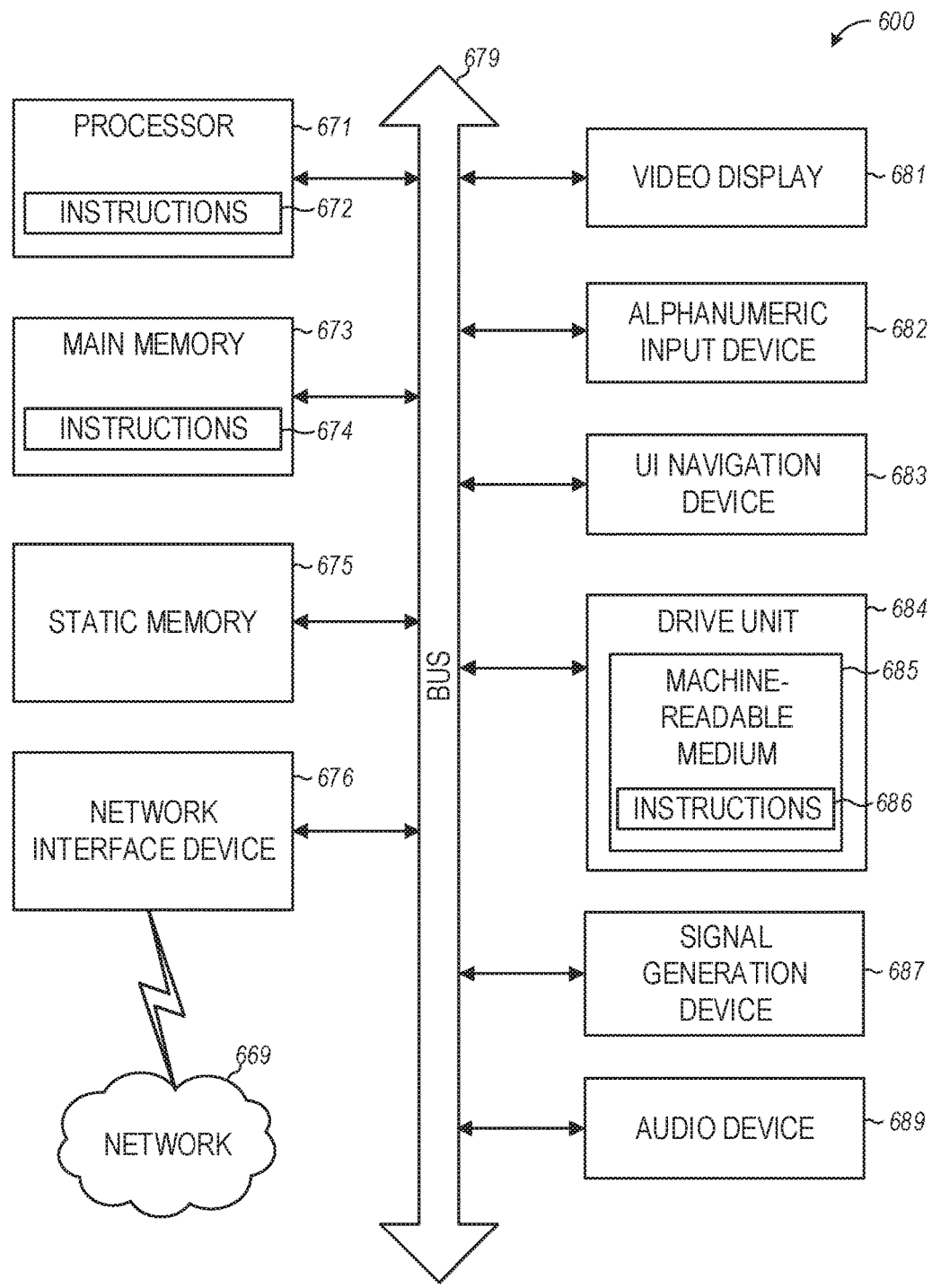
FIG. 6 is a block diagram illustrating features of an example system, within which a set or sequence of instructions may be executed to cause the system to perform any one of the methodologies discussed herein, in accordance with various embodiments.

FIG. 6 is a block diagram illustrating features of an embodiment of an example system 600, within which a set or sequence of instructions may be executed to cause the system to perform any one of the methodologies discussed herein. System 600 represents one or more machines associated with speaker-invariant training via adversarial learning for speech recognition, as taught herein. System 600 may be a machine that operates as a standalone device or may be networked to other machines. In a networked deployment, the system 600 may operate in the capacity of either a server or a client machine in server-client network environments, or it may act as a peer machine in peer-to-peer (or distributed) network environments. Further, while system 600 is shown only as a single machine, the term "system" shall also be taken to include any collection of machines that individually or jointly execute a set (or multiple sets) of instructions to perform any one or more of the methodologies discussed herein.

System 600 can include one or more processors 671, a main memory 673 and a static memory 677, which communicate with each other via a link 679 (e.g., a bus). System 600 may further include a video display unit 681, an alphanumeric input device 682 (e.g., a keyboard), and a user interface (UI) navigation device 683 (e.g., a mouse). Video display unit 681, alphanumeric input device 682, and UI navigation device 683 may be incorporated into a touch screen display. A UI of system 600 can be realized by a set of instructions that can be executed by processor 671 to control operation of video display unit 681, alphanumeric input device 682, and UI navigation device 683. The UI can control input for real-time speaker-invariant training via adversarial learning for speech recognition embedded in instructions in components of system 600.

System 600 may additionally include a storage device 684 (e.g., a drive unit), a signal generation device 687 (e.g., a speaker), a network interface device 676, and one or more sensors (not shown), such as a global positioning system (GPS) sensor, compass, accelerometer, or other sensor. System 600 may also include an audio device 689 having an audio input, such as for example a microphone, and an audio output, such as for example a speaker. The communications may be provided using a bus 679, which can include a link in a wired transmission or a wireless transmission.

Storage device 684 can include a machine-readable medium 685 on which is stored one or more sets of data structures and instructions 686 (e.g., software) embodying or utilized by any one or more of the methodologies or functions described herein. Storage device 684 may be implemented as a drive unit to provide a response to automatic speech recognition for an application for which automatic speech recognition is implemented. The instructions 686 may also reside, completely or at least partially, within the main memory 673, static memory 675, and/or within the processors 671 during execution thereof by system 600, with main memory 673, static memory 675, and processors 671 also constituting machine-readable media. Components of speaker-invariant training via adversarial learning for speech recognition and associated architecture, as taught herein, can be distributed as modules having instructions in one or more of the machine-readable medium 685, main memory 673, static memory 675, and/or within the processors 671 during execution thereof by system 600).

While the machine-readable medium 685 is illustrated in an example embodiment to be a single medium, the term "machine-readable medium" may include a single medium or multiple media (e.g., a centralized or distributed database, and/or associated caches and servers) that store the one or more instructions 686. The term "machine-readable medium" shall also be taken to include any tangible medium that is capable of storing instructions for execution by the machine and that cause the machine to perform any one or more of the methodologies taught herein or that is capable of storing data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 686 may further be transmitted or received over a communications network 669 using a transmission medium via the network interface device 676 utilizing any one of a number of well-known transfer protocols (e.g., HTTP). In addition, communications network 669 may operably include a communication channel propagating messages between entities for which speech frames can be transmitted and results of automatic speech recognition can be transmitted back to the source that transmitted the speech frames. Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any medium that is capable of carrying messages or instructions for execution by a machine, and includes digital or analog communications signals.

In various embodiments, systems and methods provide speaker-invariant training (SIT) via adversarial learning that can be implemented to reduce the effect of speaker variability in acoustic modeling. Such learning can be aimed at actively curtailing the inter-talker feature variability, while maximizing its senone discriminability to enhance the performance of a deep neural network (DNN) based ASR system. In SIT, a DNN acoustic model and a speaker classifier can be jointly trained to simultaneously optimize a primary task of minimizing senone classification loss and a secondary task of mini-maximizing speaker classification loss through this adversarial multi-task learning. Through this adversarial multi-task learning procedure, a feature extractor is learned as the bottom layers of the DNN acoustic model that maps the input speech frames from different speakers into speaker-invariant and senone-discriminative intermediate features, so that further senone classification is based on representations with the speaker factor already normalized out. The DNN acoustic model with SIT can be directly used to generate word transcription for unseen test speakers through one-pass online decoding. On top of the SIT DNN, further adaptation can be performed to adjust the model towards test speakers, achieving even higher ASR accuracy.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A system comprising:
   a set of processors;
   a storage device comprising instructions, which, when executed by the set of processors, cause the system to perform operations to:
   generate a feature extractor from a deep neural network acoustic model that maps input speech frames from different speakers to an intermediate feature of the deep neural network acoustic model;
   apply the intermediate feature to a senone classifier network and to a speaker classifier network; and
   train the deep neural network acoustic model and the speaker classifier network to jointly optimize a senone classification of the senone classifier network and a speaker classification of the speaker classifier network with an adversarial objective function based on a senone loss function and a speaker loss function.

2. The system of claim 1, wherein the operations to train the speaker classifier network include minimization of a speaker classification error with respect to the speaker classifier network and simultaneous maximization of the speaker classification error with respect to the feature extractor.

3. The system of claim 1, wherein the instructions to perform operations include minimization of a senone classification error with respect to the senone classifier network and the feature extractor.

4. The system of claim 1, wherein operations to jointly optimize senone classification of the senone classifier network and speaker classification of the speaker classifier network include using stochastic gradient descent.

5. The system of claim 1, wherein the adversarial objective function is a weighted difference between the senone loss function and the speaker loss function.

6. The system of claim 5, wherein simultaneous minimization and maximization of the adversarial objective function with respect to the senone classifier network, the speaker classifier network, and the feature extractor makes the intermediate feature speaker-invariant.

7. The system of claim 1, wherein the system is arranged to use the optimized classification of the senone classifier network as a component in automatic speech recognition.

8. A processor implemented method comprising:
   receiving speech frames at an input device under control of one or more processors, the speech frames corresponding to different speakers;

generating, using the one or more processors, a feature extractor from a deep neural network acoustic model that maps the received speech frames to an intermediate feature of the deep neural network acoustic model;

applying, using the one or more processors, the intermediate feature to a senone classifier network and to a speaker classifier network, and training, using the one or more processors, using the one or more processors, the deep neural network acoustic model and the speaker classifier network to jointly optimize a senone classification of the senone classifier network and a speaker classification of the speaker classifier network with an adversarial objective function based on a senone loss function and a speaker loss function.

9. The processor implemented method of claim 8, wherein training the speaker classifier network includes minimizing a speaker classification error with respect to the speaker classifier network and simultaneously maximizing the speaker classification error with respect to the feature extractor.

10. The processor implemented method of claim 8, wherein the method includes minimizing a senone classification error with respect to the senone classifier network and the feature extractor.

11. The processor implemented method of claim 8, wherein jointly optimizing senone classification of the senone classifier network and speaker classification of the speaker classifier network includes using stochastic gradient descent.

12. The processor implemented method of claim 8, wherein the adversarial objective function is a weighted difference between the senone loss function and the speaker loss function.

13. The processor implemented method of claim 12, wherein the method includes simultaneously minimizing and maximizing the adversarial objective function with respect to the senone classifier network, the speaker classifier network, and the feature extractor makes the intermediate feature speaker-invariant.

14. The processor implemented method of claim 8, wherein the method includes using the optimized classification of the senone classifier network as a component in automatic speech recognition.

15. A machine-readable storage device comprising instructions, which, when executed by a set of processors, cause a system to perform operations, the operations comprising operations to:

receive speech frames, the speech frames corresponding to different speakers;

generate a feature extractor from a deep neural network acoustic model that maps the received speech frames to an intermediate feature of the deep neural network acoustic model;

apply the intermediate feature to a senone classifier network and to a speaker classifier network; and train the deep neural network acoustic model and the speaker classifier network to jointly optimize a senone classification of the senone classifier network and a speaker classification of the speaker classifier network with an adversarial objective function based on a senone loss function and a speaker loss function.

16. The machine-readable storage device of claim 15, wherein operations to train the speaker classifier network include minimizing a speaker classification error with respect to the speaker classifier network and simultaneously maximizing the speaker classification error with respect to the feature extractor.

17. The machine-readable storage device of claim 16, wherein the instructions to perform operations include instructions to perform operations minimizing a senone classification error with respect to the senone classifier network and the feature extractor.

18. The machine-readable storage device of claim 15, wherein jointly optimizing senone classification of the senone classifier network and speaker classification of the speaker classifier network includes using stochastic gradient descent.

19. The machine-readable storage device of claim 15, wherein the adversarial objective function is a weighted difference between the senone loss function and the speaker loss function.

20. The machine-readable storage device of claim 15, wherein the instructions to perform operations include instructions to perform operations using the optimized classification of the senone classifier network as a component in automatic speech recognition.

* * * * *